US006615467B1

(12) United States Patent
Richards et al.

(10) Patent No.: US 6,615,467 B1
(45) Date of Patent: Sep. 9, 2003

(54) VALVE PRESS TOOL

(76) Inventors: Gary Richards, 351 W. 130th St., Los Angeles, CA (US) 90061; Roy Reed, 2872 Getwell Rd., Memphis, TN (US) 38118

( * ) Notice: Subject to any disclaimer, the term of this patent is extended or adjusted under 35 U.S.C. 154(b) by 0 days.

(21) Appl. No.: 09/811,383

(22) Filed: Nov. 24, 2000

(51) Int. Cl.[7] ................................................ B23P 19/04

(52) U.S. Cl. .......................... 29/213.1; 29/215; 29/219; 29/251

(58) Field of Search .......................... 29/219, 220, 251, 29/215, 213.1

(56) References Cited

U.S. PATENT DOCUMENTS 1,530,302 A * 3/1925 Cook .......................... 29/219
5,519,928 A * 5/1996 Hardy .......................... 29/251

* cited by examiner

*Primary Examiner*—Robert C. Watson
(74) *Attorney, Agent, or Firm*—Richard L. Mikesell

(57) ABSTRACT

A valve press tool (10) includes a C-shaped frame (12) having an adjustable platen (28) and an over-center lever device (48) at opposite ends (20, 22) of the C-frame. Attached to the over-center device is a pressure plate (40) to which is attached three legs (42) having non-skid ends (44). The pressure plate and legs are located directly opposite each other so that valve components (70) to be serviced may be placed into compression for disassembly. The platen is adjustable by means of an attached threaded rod (26) that threads into a threaded receiver (24) on one end of the C-frame. This adjustability allows the press tool to be used on various valves having different dimensions and heights.

4 Claims, 1 Drawing Sheet

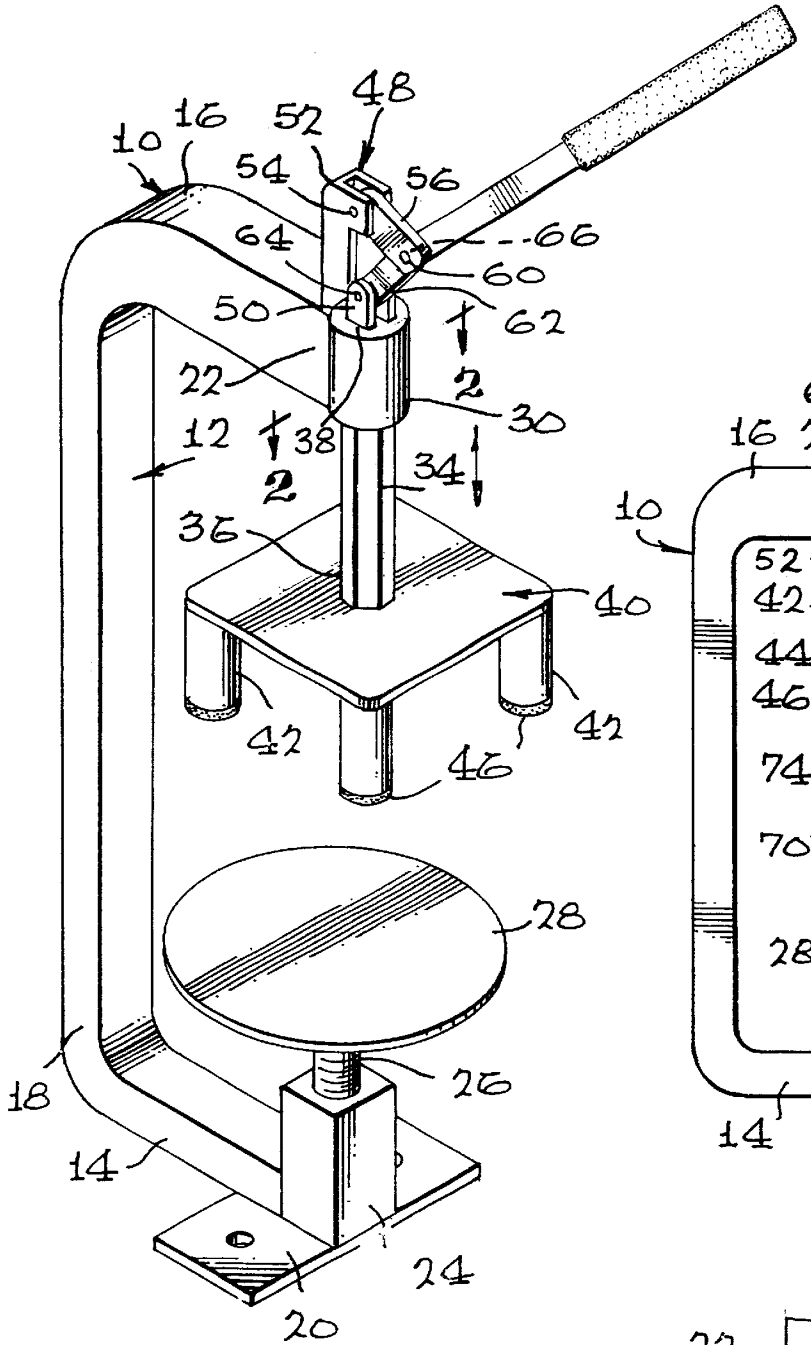
FIG. 1
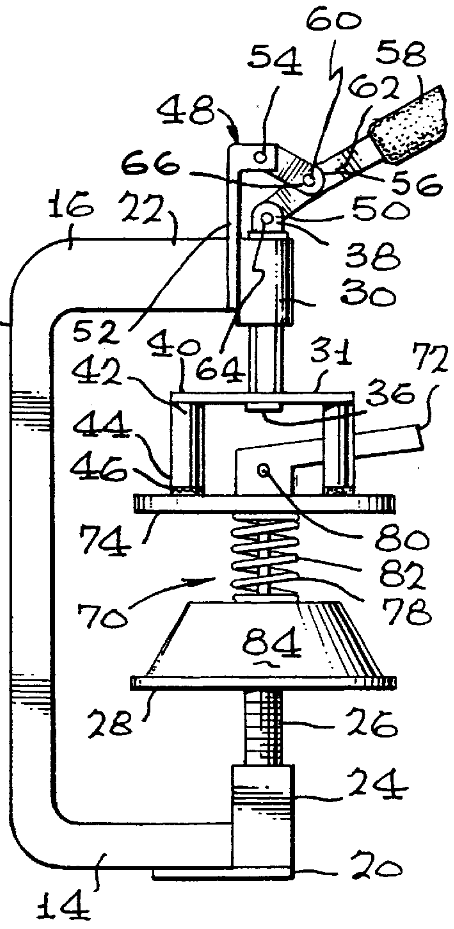
FIG. 3
FIG. 2
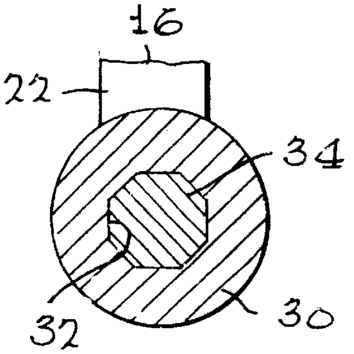

VALVE PRESS TOOL

CROSS-REFERENCE TO RELATED APPLICATION

Not Applicable

REFERENCE REGARDING FEDERAL SPONSORSHIP

Not Applicable

REFERENCE TO MICROFICHE APPENDIX

Not Applicable

BACKGROUND OF THE INVENTION

1. Field of the Invention

The present invention relates to a valve press tool and, in the particular, to improvements in means for disassembly and reassembly of spring loaded valves.

2. Description of Related Art and Other Considerations

There are numerous valves manufactured, particularly in the swimming pool industry, that are difficult to service, for example, when the O-ring seals need to be replaced and/or lubricated. Such valves include a particularly stiff compression spring which bears against a handle pivot-retainer pin which must be compressed to allow the retainer pin to be removed to allow access to the O-ring seals. Known tools designed for this purpose include those described in U.S. Pat. Nos. 2,895,213, 4,376,331, 5,507,470, 5,680,686, and 5,713,117.

SUMMARY OF THE INVENTION

The tool of the present invention includes a C-shaped frame with an adjustable platen and an over-center lever device at the opposite ends of the C-frame. Attached to the over-center device is a pressure plate to which are attached two or more legs preferably having non-skid ends. The pressure plate and legs are located directly opposite each other so that the valve to be serviced may be placed into compression for disassembly. The platen is adjustable by means of an attached threaded rod that threads into a threaded receiver on one end of the C-frame. This adjustability allows the press tool to be used on various valves having different dimensions and heights.

Several advantages are derived from this arrangement. Valves are firmly held in position for easy disassembly and assembly. The component parts of the valve pressure tool are simple and of low cost. The tool is adaptable for use with many differently designed and dimensioned valves and their components.

Other aims and advantages, as well as a more complete understanding of the present invention, will appear from the following explanation of an exemplary embodiment and the accompanying drawings thereof.

BRIEF DESCRIPTION OF THE DRAWINGS

FIG. 1 is perspective view of the present invention illustrating a preferred model of a valve press tool;

FIG. 2 is a view in cross-section of a portion of the tool depicted in FIG. 1 taken along line 2—2 thereof; and FIG. 3 is an elevational view of the tool depicted in FIG. 1 and a valve assembly positioned therein.

DETAILED DESCRIPTION OF THE PREFERRED EMBODIMENT

Referring to FIGS. 1 and 2, as valve press tool 10 includes a frame 12, having a general C-shape or U-shape or the like, to form lower and upper arms 14 and 16 joined by a central segment 18. The lower and upper arms terminate in respective ends 20 and 22.

An internally threaded retainer 24 is secured to lower arm end 20. A threaded rod 26 is threaded into retainer 24. A platen 28 is secured to the threaded rod which, when rotated, moved the platen up or down.

Upper arm end 22 terminates in a cuff 30 having an internal opening 32, preferably of a non-circular shape, for example, hexagonally configured. A shaft 34, having a cross-sectional shape which is configured similarly to that of cuff opening 32, or is integrally formed therewith, is received therein for longitudinal, but non-rotational movement therein. Shaft 34 terminates in ends 36 and 38.

A pressure plate 40 is affixed to shaft 34 at its end 36, and terminates in a plurality of legs 42, preferably three in number. Ends 44 of legs 42 may terminate in non-skid material 46.

An over-center device 48 includes a forked member 50 secured to end 38 of shaft 34. A forked extension 52 is secured to upper arm end 22, adjacent cuff 30, and extends therefrom in a direction generally away from lower arm end 14. Forked extension 52 terminates in a pivot 54, to which a link 56 is pivotally coupled. A handle 58 has a first pivot 60 coupled at one end 62 to a pivot 64 on forked member 50 at shaft end 38. Between the ends of handle 58, a pivot 66 is coupled to link 56. The combination of elements in over-center device 48 permits pressure plate 40 and its legs 42 to be snapped downwardly towards platen 28, and to be held securely in position.

As shown in FIG. 3, a valve or components thereof, generally identified by indicium 70, is disposed to be placed and held within valve press tool 10. Valve/components 70 include a handle 72, a valve cover 74 having an opening 76 therein, a rod 78 extending through the cover opening and pivotally connected to handle 72 by a pin 80, a spring 82 positioned about rod 78 and compressibly bearing against the handle and the cover and a diverter 84.

In operation, valve/components 70 are positioned in tool 10 for being held securely therein through the medium of non-skid material 44 on ends 44 of legs 42. Handle 58 is manipulated to push valve cover 74 downwardly to compress spring 82, to relieve any pressure on pivot pin 80 between valve handle 72 and rod 78, and to maintain this relationship due to the over-center construction of over-center lever device 48. Pin 80 may then be removed, and handle 72 disassembled from rod 78. Release of the over-center lever device permits the valve components to be fully disassembled, including spring 82. Any repair, replacement of parts or other servicing of the valve components may then be performed. Replacement of the components, and any replaced parts in the valve press tool, along with manipulation of over-center lever device 48, permits reassembly of the valve.

For use of tool 10 with other valves having different dimensions and heights, platen 28 may be appropriately adjusted upwardly or downwardly by means of the threaded connection between threaded rod 26 and threaded receiver 24.

Although the invention has been described with respect to a particular embodiment thereof, it should be realized that various changes and modifications may be made therein without departing from the spirit and scope of the invention.

What is claimed is:

1. For use with a valve assembly provided with components including a handle, a rod pivotally connected thereto by a pin and a spring positioned about the rod and compressibly bearing against the handle, a valve press tool for servicing of said valve assembly comprising:

a generally C-shaped frame having opposed first and second ends;

a platen positioned at said first end;

an over-center lever mechanism positioned at said second end;

a pressure plate coupled to said over-center mechanism; and a plurality of legs with non-skid ends secured to said pressure plate and spaced from said platen to enable receipt and holding of the valve components for compression of said spring and disassembly, servicing and reassembly of the rod, handle and pin connection.

2. For use with a valve assembly provided with components including a handle, a rod pivotally connected thereto by a pin and a spring positioned about the rod and compressibly bearing against the handle, a valve press tool for servicing of said valve assembly comprising:

a generally C-shaped frame having opposed first and second ends;

a platen positioned at said first end;

an over-center lever mechanism positioned at said second end;

a pressure plate coupled to said over-center mechanism; and a plurality of legs with non-skid ends secured to said pressure plate and spaced from said platen to enable receipt and holding of the valve components for compression of said spring and disassembly, servicing and reassembly of the rod, handle and pin connection; and a receiver having threads therein positioned at said first end; and a threaded rod secured to said platen and threadedly engaged with said receiver for movement of said platen towards and away from said legs, to permit adjustment of the space between said legs and said platen and to enable servicing of different valves of varying dimensions and heights.

3. A valve press tool according to claim 2 further including a shaft coaxially aligned with said threaded rod, and secured at one end to said pressure plate and provided with a pivot at its other end, and in which said over-center lever mechanism comprises:

a member secured to said second end and having means defining an internal tubular opening for supporting said pressure plate shaft;

an extension extending from said second end generally in a direction away from said fist end, and terminating in a pivot;

a link pivotally secured to said extension at said extension pivot;

a handle having a first pivot coupled at one end to said shaft pivot, and a midpoint pivot coupled to said link.

4. A valve press tool according to claim 3 in which said pressure plate shaft is non-circular in cross-section and said tubular opening means is configured similarly to that of said non-circular shaft to prevent rotation therebetween.

* * * * *